US012783474B2

(12) United States Patent
Sengottuvelu

(10) Patent No.: US 12,783,474 B2
(45) Date of Patent: Nov. 3, 2026

(54) STRUCTURED DATA CONVERSION USING LARGE LANGUAGE MODEL AND FINITE STATE MACHINE

(71) Applicant: Ramp Business Corporation, New York, NY (US)

(72) Inventor: Rahul Gunasekaran Sengottuvelu, New York, NY (US)

(73) Assignee: Ramp Business Corporation, New York, NY (US)

( * ) Notice: Subject to any disclaimer, the term of this patent is extended or adjusted under 35 U.S.C. 154(b) by 0 days.

(21) Appl. No.: 19/186,440

(22) Filed: Apr. 22, 2025

(65) Prior Publication Data

US 2025/0335401 A1 Oct. 30, 2025

Related U.S. Application Data

(60) Provisional application No. 63/638,325, filed on Apr. 24, 2024.

(51) Int. Cl.
*G06F 16/21* (2019.01)
*G06N 3/047* (2023.01)

(52) U.S. Cl.
CPC ........... *G06F 16/211* (2019.01); *G06N 3/047* (2023.01)

(58) Field of Classification Search
CPC ....... G06F 16/211; G06N 3/047; G06N 20/00
See application file for complete search history.

(56) References Cited

U.S. PATENT DOCUMENTS 10,860,931 B1 * 12/2020 Venter ........................ G06N 5/02
11,341,339 B1 * 5/2022 Li ............................ G06F 40/40
2021/0110912 A1 * 4/2021 Mukherjee ............ G06F 40/253
2023/0132261 A1 * 4/2023 Bulatov ........... G06V 30/19013 382/118
2023/0177024 A1 * 6/2023 Anand ................... G06N 5/022 707/791
2023/0237053 A1 * 7/2023 Dangoor ............. G06F 16/3322 707/767
2024/0104391 A1 * 3/2024 Higgins .............. G06F 16/3329

* cited by examiner

*Primary Examiner* — Ann J Lo
*Assistant Examiner* — Fernando M Mari Valcarcel
(74) *Attorney, Agent, or Firm* — Fenwick & West LLP

(57) ABSTRACT

A method for converting unstructured data. The method includes receiving a custom-defined data schema that is constructed according to a structured data syntax. The method includes converting the custom-defined data schema into a language model modifier that restricts outputs based on preceding outputs and integrating the language model modifier with an autoregressive machine-learned language model (LLM) to modify output scores of the autoregressive LLM. When receiving a data file that includes unstructured data, the method includes generating a first output from the autoregressive LLM and receiving a set of tokens representing candidates of a second output succeeding the first output. Each token is associated with a score. The method further includes identifying a rule in the language model modifier using the first output, modifying scores of the tokens that violate the rule and selecting one of the tokens as the second output based on the modified scores.

17 Claims, 6 Drawing Sheets

300

300

STRUCTURED DATA CONVERSION USING LARGE LANGUAGE MODEL AND FINITE STATE MACHINE

CROSS-REFERENCE TO RELATED APPLICATION

This application claims the benefit of U.S. Provisional Application No. 63/638,325, filed Apr. 24, 2024, which is incorporated by reference herein in its entirety.

TECHNICAL FIELD

The present disclosure generally relates to report and presentation of data records and, particularly, data conversion using large language model and finite state machine.

BACKGROUND

Data is a valuable, powerful asset for organizations. However, big data with large volumes and complexities don't always drive actionable insights. Traditional content extraction methods based on training models on specific spans of annotated data or on NER algorithms have been widely used in various applications, including information retrieval, document summarization, question answering systems, and more. However, these methods may require a large amount of annotated training data and careful feature engineering to achieve high performance, and they may struggle with generalization to new domains or languages. Traditional content extraction methods, while widely used, face several challenges. These include their heavy reliance on annotated data for model training, limited generalization capabilities to new domains or languages, and the need for manual feature engineering. Additionally, generating structured data using existing language models is a challenging task. The generated structured data must be syntactically correct, and it must conform to a schema that specifies the structure of the desired syntax.

Current approaches to this problem are brittle and error-prone. They rely on prompt engineering, fine-tuning, and post-processing, but they still fail to generate syntactically correct structured data in many cases.

SUMMARY

Embodiments are related to a process for converting unstructured data to structured data in a data file. The method may include receiving a custom-defined data schema. The custom-defined data schema is constructed according to a structured data syntax. The method includes converting the custom-defined data schema into a language model modifier that restricts outputs based on preceding outputs. The method further includes integrating the language model modifier with an autoregressive machine-learned language model to modify output scores of the autoregressive machine-learned language model. When receiving a data file that includes unstructured data, the method includes applying the autoregressive machine-learned language model to the unstructured data to generate a structured dataset that follows the custom-defined data schema. In some embodiments, the method includes generating a first output from the autoregressive machine-learned language model and receiving a set of tokens representing candidates of a second output succeeding the first output. Each token is associated with a score. The method also includes identifying a rule in the language model modifier using the first output, modifying one or more scores of the tokens that violate the rule and selecting one of the tokens as the second output based on the modified scores.

Embodiments are further related to a system that converts unstructured data to structured data in a data file. The system may include a processor; and a non-transitory computer-readable storage medium having instructions that, when executed by the processor, cause the computer system to perform operations. The system may receive a custom-defined data schema that is constructed according to a structured data syntax. The system converts the custom-defined data schema into a language model modifier that restricts outputs based on preceding outputs and integrates the language model modifier with an autoregressive machine-learned language model to modify output scores of the autoregressive machine-learned language model. When receiving a data file that includes unstructured data, the system applies the autoregressive machine-learned language model to the unstructured data to generate a structured dataset that follows the custom-defined data schema. The system may generate a first output from the autoregressive machine-learned language model and receive a set of tokens representing candidates of a second output succeeding the first output. Each token is associated with a score. The system identifies a rule in the language model modifier using the first output, modifies one or more scores of the tokens that violate the rule and selects one of the tokens as the second output based on the modified scores.

Embodiments are further related to a computer program product that converts unstructured data to structured data in a data file. The computer program product includes a non-transitory computer readable storage medium having instructions encoded thereon that, when executed by a processor, cause the processor to perform operations. The computer program product may receive a custom-defined data schema that is constructed according to a structured data syntax. The computer program product converts the custom-defined data schema into a language model modifier that restricts outputs based on preceding outputs and integrates the language model modifier with an autoregressive machine-learned language model to modify output scores of the autoregressive machine-learned language model. When receiving a data file that includes unstructured data, the computer program product applies the autoregressive machine-learned language model to the unstructured data to generate a structured dataset that follows the custom-defined data schema. The computer program product may generate a first output from the autoregressive machine-learned language model and receive a set of tokens representing candidates of a second output succeeding the first output. Each token is associated with a score. The computer program product identifies a rule in the language model modifier using the first output, modifies one or more scores of the tokens that violate the rule and selects one of the tokens as the second output based on the modified scores.

The FIGURES depict various embodiments for purposes of illustration only. One skilled in the art will readily recognize from the following discussion that alternative embodiments of the structures and methods illustrated herein may be employed without departing from the principles described herein.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying FIGURES. It is noted that wherever practicable similar or like reference numbers may be used in the FIGURES and may indicate similar or like functionality. The FIGURES depict embodiments of the disclosed system (or method) for purposes of illustration only. One skilled in the art will readily recognize from the following description that alternative embodiments of the structures and methods illustrated herein may be employed without departing from the principles described herein.

System Overview

Figure 1:
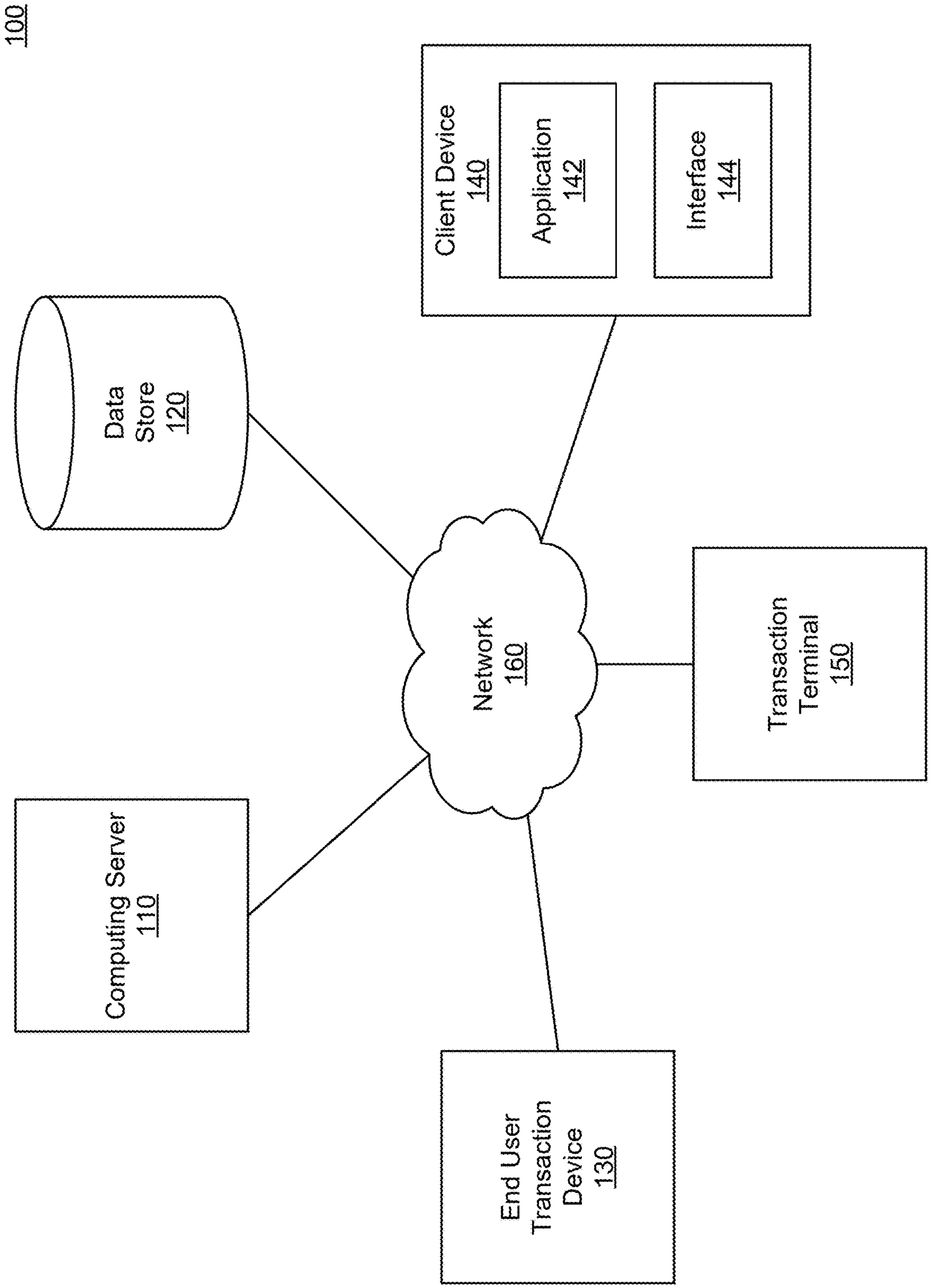
FIG. 1 is a block diagram illustrating an example system environment, in accordance with an embodiment.

FIG. 1 is a block diagram that illustrates a data management system environment 100, in accordance with an embodiment. The system environment 100 includes a computing server 110, a data store 120, an end user transaction device 130, a client device 140, and a transaction terminal 150. The entities and components in the system environment 100 communicate with each other through a network 160. In various embodiments, the system environment 100 includes fewer or additional components. In some embodiments, the system environment 100 also includes different components. While each of the components in the system environment 100 is described in a singular form, the system environment 100 may include one or more of each of the components. For example, in many situations, the computing server 110 can issue multiple end user transaction devices 130 for different end users. Different client devices 140 may also access the computing server 110 simultaneously.

The computing server 110 includes one or more computers that perform various tasks related to data processing and management of accounting, payment, and transactions of various clients of the computing server 110. For example, the computing server 110 creates credit cards and accounts for an organization client and manages transactions of the cards of the organization client based on rules set by the client (e.g., pre-authorization and restrictions on certain transactions). Examples of organizations may include commercial businesses, educational institutions, private or government agencies, or any suitable group of one or more individuals that engage in transactions with a named entity (e.g., a merchant) using an account associated with a credit card. In some embodiments, a named entity may be an identifiable real-world entity that may be detectable in data of an organization. For example, a specific merchant may be a named entity that provides goods or services for purchase by end users through a transaction terminal 150. An end user may be a member of an organization client such as an employee of the organization or an individual that uses the end user transaction device 130 to make purchase from a named entity. In one embodiment, the computing server 110 provides its clients with various transaction management services as a form of cloud-based software, such as software as a service (Saas).

In some embodiments, the computing server 110 may be a server that manages authorizations on behalf of a domain. The computing server 110 may generate a set of data through authorizations. The set of data may include authorization records between user accounts of the domain and the named entities. For example, the authorization records may include transaction records, payment records, etc. In some embodiments, the computing server 110 may receive data from one or more external data sources such as transaction terminals 150 or third-party servers. In some embodiments, the received data may be electronic fund transfers, payments records, credit card transaction records, etc. In some embodiments, the computing server 110 may aggregate the generated data and the received data to produce an aggregated set of data. The aggregated data may be used to generate a data report upon request. Examples of components and functionalities of the computing server 110 are discussed in further detail below with reference to FIG. 2. The computing server 110 may provide a SaaS platform for various clients to manage their accounts and transaction rules related to the accounts.

In some embodiments, the computing server 110 converts unstructured data to structured data with a custom-defined data schema, which is constructed according to a structured data syntax. The computing server 110 may integrate a language model modifier with an autoregressive machine-learned language model to perform the conversion. In some implementations, the language model modifier may be a finite state machine (FSM) that restricts outputs based on preceding outputs. The FSM ensures the validity of the output in terms of both structure and syntax, while predictive token injection guides the language model to produce output aligned with the custom-defined structure. For example, the computing server 110 may apply the FSM to modify the scores of the tokens output from the language model, and the computing server 110 selects tokens based on the modified scores as the output. In this way, the computing server 110 extracts structured data from diverse multimodal inputs.

In some embodiments, the computing server 110 may set up policy rules to audit transactions. For example, the computing server 110 may audit the transactions and determine whether the transaction related document meet one or mor of policy rules. When determining that the document does not meet at least on policy rule, the computing server 110 may notify the user about rules that were violated based on the policy rules.

The data store 120 includes one or more computing devices that include memory or other storage media for storing various files and data of the computing server 110. The data stored in the data store 120 includes accounting information, transaction data, credit card profiles, card rules and restrictions, merchant profiles, merchant identification rules, documentation records, record verification rules, policy rules for reimbursement, and other related data associated with various clients of the computing server 110. In some embodiments, the set of data that is generated by the computing server 110 though authorizations may be stored in the data store 120.

In various embodiments, the data store 120 may take different forms. In one embodiment, the data store 120 is part of the computing server 110. For example, the data store 120 is part of the local storage (e.g., hard drive, memory card, data server room) of the computing server 110. In some embodiments, the data store 120 is a network-based storage server (e.g., a cloud server). The data store 120 may be a third-party storage system such as AMAZON AWS, DROPBOX, RACKSPACE CLOUD FILES, AZURE BLOB STORAGE, GOOGLE CLOUD STORAGE, etc. The data in the data store 120 may be structured in different database formats such as a relational database using the structured query language (SQL) or other data structures such as a non-relational format, a key-value store, a graph structure, a linked list, an object storage, a resource description framework (RDF), etc. In one embodiment, the data store 120 uses various data structures mentioned above.

An end user transaction device 130 is a device that enables the holder of the device 130 to perform a transaction with a party (e.g., a named entity), such as making a payment to a merchant for goods and services based on information and credentials stored at the end user transaction device 130. An end user transaction device 130 may also be referred to as an end user payment device. Examples of end user transaction devices 130 include payment cards such as credit cards, debit cards, and prepaid cards, other smart cards with chips such as radio frequency identification (RFID) chips, portable electronic devices such as smart phones that enable payment methods such as APPLE PAY or GOOGLE PAY, portable electronic devices that store one or more virtual credit cards, and wearable electronic devices. The computing server 110 issues accounts associated with the end user transaction devices 130. For example, the computing server 110 may issue accounts for virtual credit cards for its organization clients. While credit cards are often used as examples in the discussion of this disclosure, various architectures and processes described herein may also be applied to other types of end user transaction devices 130. In some cases, an end user transaction device 130 may also be a virtual device such as a virtual credit card.

A client device 140 is a computing device that belongs to a client of the computing server 110. A client uses the client device 140 to communicate with the computing server 110 and performs various payment and spending management related tasks such as creating credit cards and associated payment accounts, setting transaction and record verification rules and restrictions on cards, setting pre-authorized or prohibited merchants or merchant categories (e.g., entertainment, travel, education, health, etc.), and managing transactions and records (e.g., verifying a documentation record). The user of the client device 140 may be a manager, an accounting administrator, or a general employee of an organization. While in this disclosure a client is often described as an organization, a client may also be a natural person or a robotic agent. A client may be referred to an organization or its representative such as its employee.

A client device 140 includes one or more applications 142 and interfaces 144 that may display visual elements of the applications 142. The client device 140 may be any computing device. Examples of such client devices 140 include personal computers (PC), desktop computers, laptop computers, tablets (e.g., iPADs), smartphones, wearable electronic devices such as smartwatches, or any other suitable electronic devices.

The application 142 is a software application that operates at the client device 140. In one embodiment, an application 142 is published by the party that operates the computing server 110 to allow clients to communicate with the computing server 110. For example, the application 142 may be part of a SaaS platform of the computing server 110 that allows a client to create credit cards and accounts and perform various payment and spending management tasks (e.g., confirm documentation records have been verified). In various embodiments, an application 142 may be of different types. In one embodiment, an application 142 is a web application that runs on JavaScript and other backend algorithms. In the case of a web application, the application 142 cooperates with a web browser to render a front-end interface 144. In another embodiment, an application 142 is a mobile application. For example, the mobile application may run on Swift for iOS and other APPLE operating systems or on Java or another suitable language for ANDROID systems. In yet another embodiment, an application 142 may be a software program that operates on a desktop computer that runs on an operating system such as LINUX, MICROSOFT WINDOWS, MAC OS, or CHROME OS.

An interface 144 is a suitable interface for a client to interact with the computing server 110. The client may communicate to the application 142 and the computing server 110 through the interface 144. The interface 144 may take different forms. In one embodiment, the interface 144 may be a web browser such as CHROME, FIREFOX, SAFARI, INTERNET EXPLORER, EDGE, etc. and the application 142 may be a web application that is run by the web browser. In one embodiment, the interface 144 is part of the application 142. For example, the interface 144 may be the front-end component of a mobile application or a desktop application. In one embodiment, the interface 144 also is a graphical user interface which includes graphical elements and user-friendly control elements.

In some embodiments, the client device 140 and the end user transaction device 130 belong to the same domain. For example, a company client can request the computing server 110 to issue multiple company credit cards for the employees. In other embodiments, the client device 140 and the end user transaction device 130 may be controlled by individuals who are unrelated.

A transaction terminal 150 is an interface that allows an end user transaction device 130 to make electronic fund transfers with a third party such as a third-party named entity. Electronic fund transfer can be credit card payments, automated teller machine (ATM) transfers, direct deposits, debits, online transfers, peer-to-peer transactions such as VENMO, instant-messaging fund transfers such as FACEBOOK PAY and WECHAT PAY, wire transfer, electronic bill payment, automated clearing house (ACH) transfer, cryptocurrency transfer, blockchain transfer, etc. Depending on the type of electronic fund transfers, a transaction terminal 150 may take different forms. For example, if an electronic fund transfer is a credit card payment, the transaction terminal 150 can be a physical device such as a point of sale (POS) terminal (e.g., a card terminal) or can be a website for online orders. An ATM, a bank website, a peer-to-peer mobile application, and an instant messaging application can also be examples of a transaction terminal 150. The third party is a transferor or transferee of the fund transfer. For example, in a card transaction, the third party may be a named entity (e.g., a merchant). In an electronic fund transfer such as a card payment for a merchant, the transaction terminal 150 may generate a transaction data payload that carries information related to the end user transaction device 130, the merchant, and the transaction. The transaction data payload is transmitted to other parties, such as credit card companies or banks, for approval or denial of the transaction. Transaction may also be recorded manually or performed via instruments such as ACH, wire, check, etc. The transaction terminal in such a case may be a computing device.

In various embodiments, a named entity such as a merchant may automatically generate a documentation record to document an occurred transaction. The documentation record, which may also simply be referred to as a record, may be generated by the transaction terminal 150 or a server of the named entity. A documentation record serves as a record of a transaction between a named entity and an end user. For example, after a purchase using a POS terminal, the terminal (which broadly may mean the terminal itself or the server of the terminal) may automatically generate a paper or email receipt for the customer. A documentation record can include the name of the named entity (e.g., the merchant), a location at which the transaction occurred, a time at which the transaction occurred, an amount which was exchanged during the transaction (e.g., an amount of currency), an itemized list of goods or services purchased, a whole or portion of an identifier of the end user transaction device 130 (e.g., the last four digits of a credit card number), any suitable data describing the transaction, or a combination thereof. The transaction terminal 150 may provide the generated documentation record to the end user transaction device 130, a computing device of the end user (e.g., a laptop computer of the end user), the computing server 110, or a combination thereof. In some embodiments, the documentation record may be included within the transaction data payload. The documentation record may take various forms, including a paper receipt, a digital image of a paper receipt, an email, a short message service (SM S) text, a Quick Response (QR) code, a physical invoice, an electronic invoice, a statement, or any suitable form for providing data describing a transaction to the end user or the computing server 110.

Various servers in this disclosure may take different forms. In one embodiment, a server is a computer that executes code instructions to perform various processes described in this disclosure. In another embodiment, a server is a pool of computing devices that may be located at the same geographical location (e.g., a server room) or be distributed geographically (e.g., clouding computing, distributed computing, or in a virtual server network). In one embodiment, a server includes one or more virtualization instances such as a container, a virtual machine, a virtual private server, a virtual kernel, or another suitable virtualization instance.

The network 160 provides connections to the components of the system environment 100 through one or more subnetworks, which may include any combination of local area and/or wide area networks, using both wired and/or wireless communication systems. In one embodiment, a network 160 uses standard communications technologies and/or protocols. For example, a network 160 may include communication links using technologies such as Ethernet, 802.11, worldwide interoperability for microwave access (WiMAX), 3G, 4G, Long Term Evolution (LTE), 5G, code division multiple access (CDMA), digital subscriber line (DSL), etc. Examples of network protocols used for communicating via the network 160 include multiprotocol label switching (M PLS), transmission control protocol/Internet protocol (TCP/IP), hypertext transport protocol (HTTP), simple mail transfer protocol (SMTP), and file transfer protocol (FTP). Data exchanged over a network 160 may be represented using any suitable format, such as hypertext markup language (HTML), extensible markup language (XML), JavaScript object notation (JSON), structured query language (SQL). In some embodiments, some of the communication links of a network 160 may be encrypted using any suitable technique or techniques such as secure sockets layer (SSL), transport layer security (TLS), virtual private networks (VPNs), Internet Protocol security (IPsec), etc. The network 160 also includes links and packet switching networks such as the Internet. In some embodiments, a data store belongs to part of the internal computing system of a server (e.g., the data store 120 may be part of the computing server 110). In such cases, the network 160 may be a local network that enables the server to communicate with the rest of the components.

Example Server Components

Figure 2:
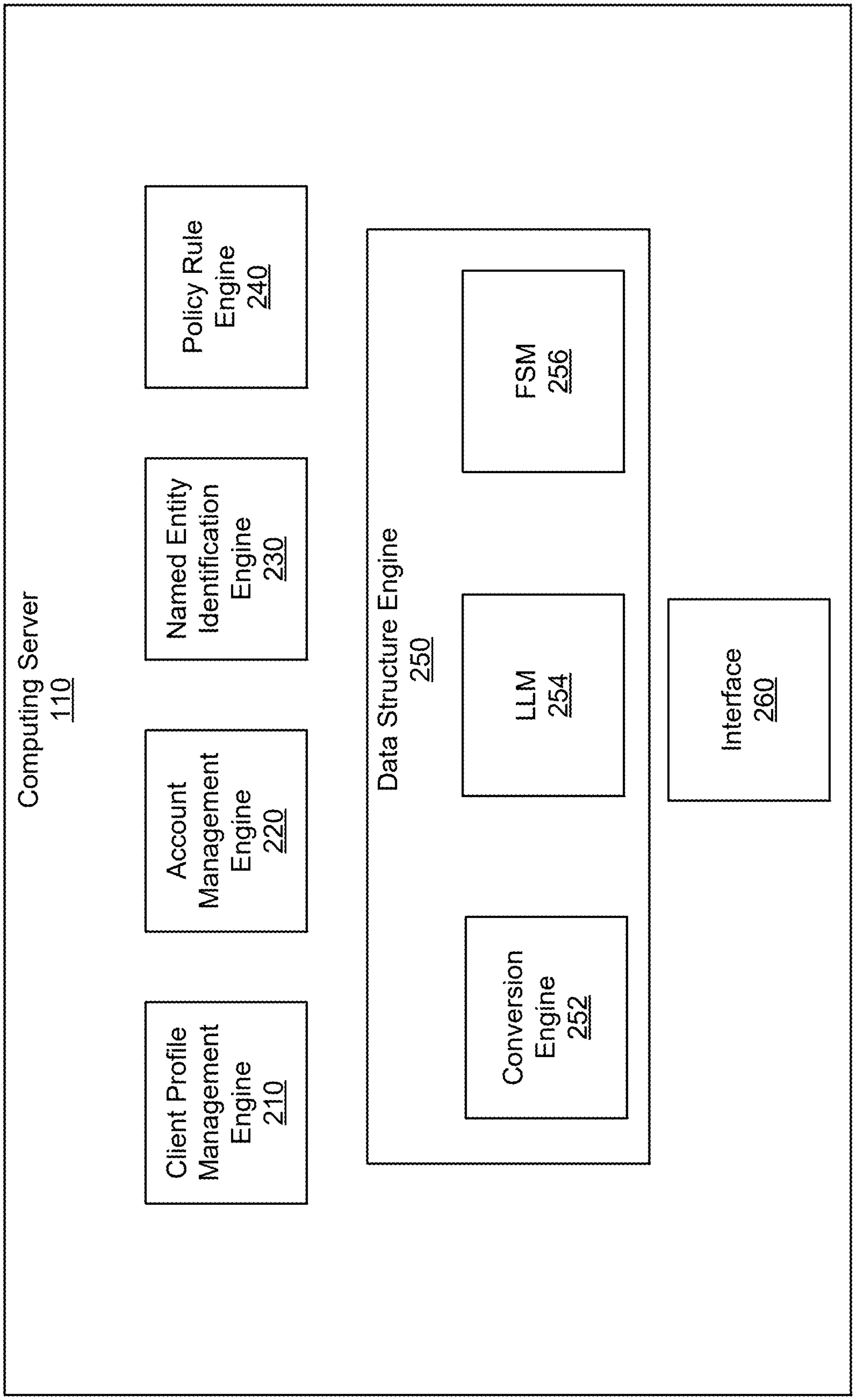
FIG. 2 includes block diagrams illustrating components of an example computing server, in accordance with an embodiment.

FIG. 2 is a block diagram illustrating components of a computing server 110, in accordance with an embodiment. The computing server 110 includes a client profile management engine 210, an account management engine 220, a named entity identification engine 230, a policy rule engine 240, a data structure engine 250, and an interface 260. In various embodiments, the computing server 110 may include fewer or additional components. The computing server 110 also may include different components. The functions of various components may be distributed in a different manner than described below. Moreover, while each of the components in FIG. 2 may be described in a singular form, the components may present in plurality. The components may take the form of a combination of software and hardware, such as software (e.g., program code comprised of instructions) that is stored on memory and executable by a processing system (e.g., one or more processors).

The client profile management engine 210 stores and manages end user data and transaction data of clients of the computing server 110. The computing server 110 can serve various clients associated with end users such as employees, vendors, and customers. For example, the client profile management engine 210 may store the employee hierarchy of an organizational client to determine the administrative privilege of an employee in creating a credit card account and in setting transaction and record verification rules. An administrator of the client may specify that certain employees from the financial department and managers have the administrative privilege to create cards for other employees. The client profile management engine 210 assigns metadata tags to transaction data of an organization to categorize the transactions in various ways, such as by transaction types, by merchants, by date, by amount, by card, by employee groups, etc. The client profile management engine 210 can monitor the spending of a client by category and also by the total spending. The spending amounts may affect the results of transaction and record verification rules that are specified by a client's system administrator. For example, a client may limit the total monthly spending of an employee group. The computing server 110 may deny further card payments after the total spending exceeds the monthly budget.

The transaction data stored by the client profile management engine 210 can include a record of a transaction, where the record includes data such as an amount of the transaction, the date of the transaction, a named entity that accepted a request by the end user to initiate the transaction (e.g., the merchant that accepted an end user's request to purchase the merchant's service), or combination thereof. The client profile management engine 210 may store the data in a data structure and/or store the record as provided by a device of the end user or the transaction terminal 150. For example, the client profile management engine 210 may store images of receipts as taken by a camera of a computing device (e.g., smart phone) of an end user. In another example, the client profile management engine 210 may store emailed receipts as provided by a transaction terminal 150.

The account management engine 220 creates and manages accounts including payment accounts such as credit cards that are issued by the computing server 110. An account is associated with an end user such as an employee and corresponds to a card or an end user transaction device. A client may use the computing server 110 to issue domain-specific payment accounts such as company cards. The client enters account information such as the cardholder's name, role and job title of the cardholder in the client's organization, limits of the card, and transaction rules associated with the card. The client may use the client device 140 and the interface 144 to supply this information to the computing server 110. In response to receiving the account information (e.g., from the client device 140), the account management engine 220 creates the card serial number, credentials, a unique card identifier, and other information needed for the generation of a payment account and corresponding card. The account management engine 220 associates the information with the cardholder's identifier. The computing server 110 communicates with a credit card company (e.g., VISA, MASTERCARD) to associate the card account created with the identifier of the computing server 110 so that transactions related to the card will be stored at client profile management engine 210 with a mapping to identifiers for the account and the client's organization for querying transactions of the client organization. The account management engine 220 may also order the production of the physical card that is issued under the computing server 110. The cards and payment accounts created are associated with the transaction and documentation record verification rules that are specified by the client's administrator.

In some embodiments, the account management engine 220 creates rules for verifying records. A client may specify rules under which records are to be verified by the computing server 110. The client may use the interface 144 of the client device 140 to specify the rules. The rules may include a location, time, named entity, end user, account, amount (e.g., purchase amount), or any suitable parameter related to a transaction. In one example of a rule, the client specifies that a documentation record is not required to be verified for transaction amounts below 75 dollars for merchants in a travel category. In another example of a rule, the client specifies that a documentation record is required to be verified for transactions made outside of the United States. The client may specify priority for rules such that a certain rule may override another rule. For example, the account management engine 220 may determine that, under the previous two examples of rules, the client has specified that rules for requiring record verification overrides rules for not requiring verification, and verifies a documentation record for, for example, a transaction made for a train ticket in Europe using an end user transaction device issued for an end user of the client.

Upon determining that verification is or is not needed using the rules created by the account management engine 220, a record of the transaction may be annotated with an indicator for the corresponding verification requirement (e.g., verification needed or not needed). This indicator may be used when generating a user interface for the client when managing verification statuses of past transactions. Additionally, the indicator may be used to generate notifications to end users to notify the end users of the rules under which a documentation record is not necessary, which may prevent subsequent upload of records and save communication bandwidth and server storage resources. A client may establish such rules through an interface generated by the interface 260.

The named entity identification engine 230 identifies specific named entities (e.g., merchants) associated with various transactions. The computing server 110 may impose an entity-specific restriction on a card. For example, an administrator of a client may specify that a specific card can only be used with a specific named entity. The computing server 110 parses transaction data from different clients to identify patterns in the transaction data specific to certain named entities to determine whether a transaction belongs to a particular named entity. For example, in a card purchase, the transaction data includes merchant identifiers (MID), merchant category code (MCC), and the merchant name. However, those items are often insufficient to identify the actual merchant of a transaction. The MID is often an identifier that does not uniquely correspond to a merchant. In some cases, the MID is used by the POS payment terminal company such that multiple real-world merchants share the same MID. In other cases, a merchant (e.g., a retail chain) is associated with many MIDs with each branch or even each registry inside a branch having its own MID. The merchant name also suffers the same defeats as the MID. The merchant name may also include different abbreviations of the actual merchant name and sometimes misspelling. The string of the merchant name may include random numbers and random strings that are not related to the actual real-world name of the merchant. The named entity identification engine 230 applies various algorithms and machine learning models to determine the actual merchant from the transaction data. For example, the named entity identification engine 230 may search for patterns in transaction data associated with a particular merchant to determine whether a transaction belongs to the merchant. For example, a merchant may routinely insert a code in the merchant name or a store number in the merchant name. The named entity identification engine 230 identifies those patterns to parse the actual merchant name.

A named entity identification process may be used to determine the identities of named entities included in processed real-time transaction. In one embodiment, the computing server 110 determines a named entity identification rule by analyzing patterns in the volume of data associated with the plurality of clients. For example, the volume of data may include past transaction data payloads of different clients. The computing server 110 may analyze the past transaction data payloads to determine a common pattern associated with payloads of a particular named entity. The named entity identification rule may specify, for example, the location of a string, the prefix or suffix to removed, and other characteristics of the data payload. The computing server 110, upon the receipt of a transaction data payload, identifies a noisy data field in the transaction data (e.g., a noisy string of text). A noisy data field is a field that includes information more than the named entity. For example, a noisy data field may include a representation of a named entity, such as the name, an abbreviation, a nickname, a subsidiary name, or an affiliation of the named entity. The noisy data field may further include one or more irrelevant strings that may be legible but irrelevant or may even appear to be gibberish. The computing server 110 parses the representation of the named entity based on the named entity identification rule. A transaction approval process can be based on the identity of the named entity. This general framework may be used by one or more computing servers to identify named entities in transaction data payloads. U.S. patent application Ser. No. 17/351,120, entitled "Real-time Named Entity Based Transaction Approval," include additional discussion on named entity identification and is incorporated by reference herein for all purposes.

The policy rule engine 240 determines policy rules for reviewing and approving transactions and expense. The policy rule engine 240 may set up the policy rules by defining objectives, gathering input, identifying expense categories, setting limits and guidelines, specifying documentation requirements and reimbursement procedures, etc. In some embodiments, the policy rule engine 240 may determine what types of expenses are allowed, such as travel, meals, lodging, office supplies, etc. In some embodiments, the policy rule engine 240 may set maximum amounts or limits for each expense category/item. For example, the policy rules may determine that for a transaction over $75, the expenses should be itemized. If a receipt of a transaction over $75 does not include itemized expense, the policy rules may transmit a notification/alert to a user, and/or request the user to itemize the expense, submit additional document, etc. In some embodiments, the policy rules determined by the policy rule engine 240 may include, approval processes, notification and alert, required documentation, reimbursement procedures, and the like. In some embodiments, the established policy rules may be stored in the data store 120. In some embodiments, the policy rule engine 240 may update the policy rules by adding, deleting and/or modifying policy rules based on a user request and other new information.

In some embodiments, the policy rule engine 240 may apply the policy rules to a received data file. The data file may include transaction information for process a transaction request, e.g., reimbursement. The policy rule engine 240 may access a set of policy rules and audit the data file based on the set of policy rules. When determining at least one of items in the data file does not meet at least one policy rule, the policy rule engine 240 may perform an action related to the at least one item, for example, notifying the user about the violation, requesting additional document, rejecting the transaction request, etc. In some embodiments, the policy rule engine 240 may use the data structure engine 250 and the data extraction techniques discussed in FIG. 3 through FIG. 5 to automatically convert transaction information into structured data and determine whether the transaction is in compliance with one or more applicable policy rules.

The data structure engine 250 receives unstructured data and convert the unstructured data to structured data with custom defined data schema. The data structure engine 250 may include a conversion engine 252, one or more large language models (LLM s) 254, and a finite state machine (FSM) 256.

The conversion engine 252 converts unstructured data to structured data that follows a custom-defined data schema. In some embodiments, the conversion engine 252 integrates a language model modifier with an autoregressive machine-learned language model to modify output scores of the autoregressive machine-learned language model. In one implementation, the conversion engine 252 may apply the integrated auto regressive machine-learned language model to unstructured data and receive output sequence of structured data.

The LLM 254 includes one or more large language models (LLMs). The LLMs are built on transformer architectures, which are neural network architectures specifically developed for natural language processing (NLP) tasks. The LLM s undergo two main phases: pre-training and fine-tuning. During pre-training, the LLM s learns from vast amounts of text data, predicting the next output in a sequence based on the preceding output. After pre-training, the LLM s can be fine-tuned for specific tasks or domains by providing them with task-specific data. This fine-tuning process allows the model to adapt its knowledge to particular contexts, making it more effective for tasks such as text generation, translation, summarization, sentiment analysis, etc. The trained LLM s may be used generate tokens with predicted probability by assigning a probability distribution to each token in their vocabulary based on context. In some embodiments, the conversion engine 252 may apply the LLM s to unstructured data to predict outputs to form structured data.

The FSM 256 may include a language model modifier, for example, a finite state machine (FSM). The FSM may control outputs with discrete states and transitions between the states. The FSM may output a finite number of states, where the transitions between states are triggered by inputs or events. In some embodiments, the FSM 256 may be integrated with the LLM 254 to modify output scores of the LLM s so that the generated output adheres to predefined rules or constraints. In one implementation, the computing server 110 may define the desired constraints or rules for the output, e.g., valid sequences of symbols or states that the output should adhere to. In some embodiments, the FSM may determine based on the custom-defined data schema, and the FSM may determine grammatical rules, syntactic structures, or specific patterns that the output must follow.

The interface 260 includes interfaces that are used to communicate with different parties and servers. The interface 260 may take the form of a SaaS platform that provides clients with access of various functionalities provided by the computing server 110. The interface 260 provides a portal in the form of a graphical user interface (GUI) for clients to create payment accounts, manage transactions, specify rules of each card, and verify records of transactions incurred using the cards. The interface 260 is in communication with the application 142 and provides data to render the application 142.

In one embodiment, the interface 260 also includes an API for clients of the computing server 110 to communicate with the computing server 110 through machines. The API allows the clients to retrieve the computing server 110 stored in the data store 120, send query requests, and make settings through a programming language. Various settings, creation of cards, rules on the cards, rules of verifying records, and other functionalities of the various engines 210, 220, 230, and 240 may be changed by the clients through sending commands to the API.

Converting Unstructured Data to Structured Data with Custom-Defined Data Schema

Figure 3:
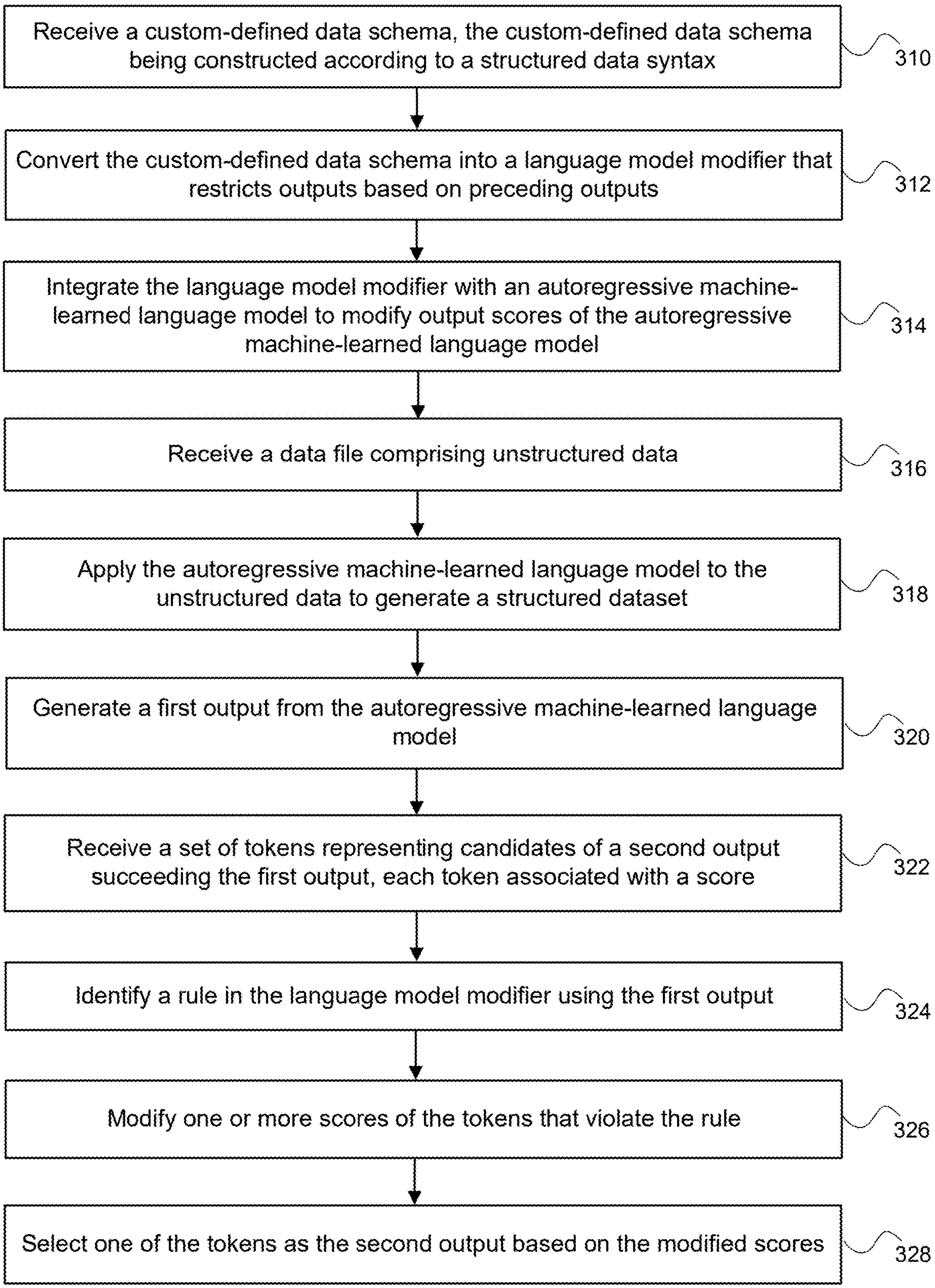
FIG. 3 is a flowchart depicting a computer-implemented process for generating structured data from unstructured data in a data file, in accordance with an embodiment.

FIG. 3 is a flowchart depicting a computer-implemented process 300 for converting unstructured data to a structured data set with a custom-defined data schema, in accordance with an embodiment. A computer associated with the computing server 110 includes a processor and memory. The memory stores a set of code instructions that, when executed by the processor, causes the processor to perform some of the steps described in the process 300.

The computing server 110 receives 310 a custom-defined data schema. In some embodiments, a data schema may refer to a framework that defines structure, organization, and/or format of data within a database or a data file. The data schema may outline rules, relationships, constraints, and definitions that govern how data is stored, accessed, and manipulated within a system. For example, in relational databases, a data schema may include data tables, columns, keys, indexes, and relationships between the data tables. In non-relational databases or data formats, such as JSON or XML, a data schema may define the structure of the data, including the fields, the corresponding types, keys, values, and any hierarchical relationships.

In some embodiments, the custom-defined data schema may be constructed according to a structured data syntax. Structured data syntax may refer to a specific syntax or format used to represent data in a structured manner, making it machine-readable and interpretable. Structured data is data that is organized in a predefined format with identifiable fields and values, making it easily interpretable by humans and machines. In some implementations, the structured data syntax may include syntax or notation used to encode structured data, such as XML, JSON, CSV, or specific markup languages like RDF (Resource Description Framework) or HTML. For example, JSON (JavaScript Object Notation) is a data interchange format that is easy for humans to read and write, and easy for machines to parse and generate. It uses key-value pairs and nested structures to represent data. In one implementation, JSON syntax may include rules and conventions for defining the structure, properties, and values of data objects. For instance, JSON data is organized into objects, which are enclosed within curly braces "{ }". Each object consists of a collection of key-value pairs, where keys are strings and values may be of various data types, including strings, numbers, arrays, objects, booleans, or null. In another example, JSON syntax may include arrays are ordered lists of values, enclosed within square brackets [ ], where arrays may contain values of any data type, including strings, numbers, objects, arrays, booleans, or null. The JSON values may include strings, numbers, objects, arrays, booleans (true or false), or null.

The computing server 110 converts 312 the custom-defined data schema into a language model modifier that restricts outputs based on preceding outputs. The language model modifier may be used to alter the behavior or output for a language model. For example, the language model modifier may be a finetuning model that modifies the language model's behavior on specific datasets or tasks. The language model modifier may include a length control that controls the length of the output from the language model. In one implementation, the language model modifier may include a finite state machine (FSM), which is a model used to represent and control outputs with discrete states and transitions between those states. The FSM may output a finite number of states, where the transitions between states are triggered by inputs or events.

Figure 4:
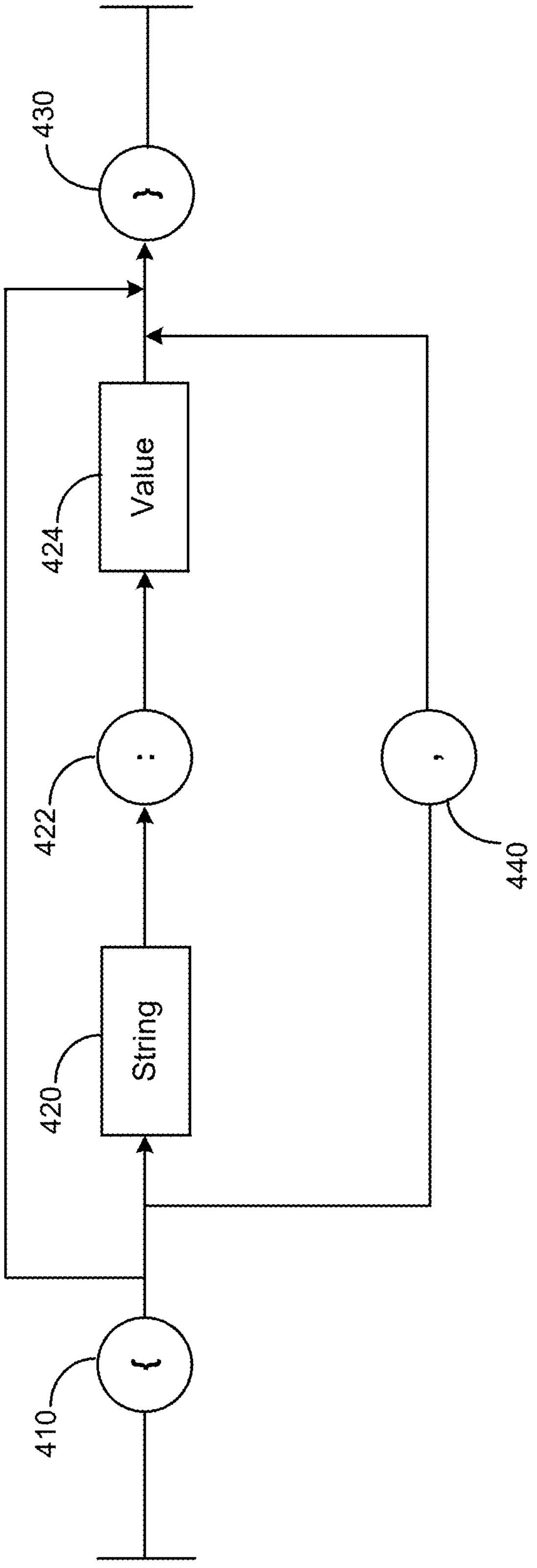
FIG. 4 graphically illustrates a finite state machine converted data schema which is constructed according to a JSON object, in accordance with an embodiment.

FIG. 4 graphically illustrates an FSM converted data schema which is constructed according to a JSON object, in accordance with an embodiment. An FSM may include a plurality of states in FIG. 4, which represent various conditions or modes that a system (e.g., structured data) may be in at any given time. Each state is typically associated with a specific behavior or set of actions. The arrows in FIG. 4 represent transitions between the states illustrated as nodes, and the edges define the rules or conditions under which the system moves from one state to another. Transitions are triggered by inputs, events, or conditions that occur while the system is in a particular state. The inputs or events may include external stimuli or triggers that cause the system to transition from one state to another. It should be noted that the syntax and grammar listed in the drawing are only examples. Different programming language will have different symbols, patterns, rules and restrictions.

In one example, the custom-defined data schema may be constructed according to JSON syntax. A JSON object may include one or more sets of key-value pairs, enclosed by braces and delimited using commas. Each key-value pair is a separated using a colon, and the keys must be strings, and values may be one of strings, numbers, objects, arrays, booleans (true or false), or null. For example, a JSON object may be presented as follow,

```
{
  "firstName": "John",
  "lastName": "Smith",
  "isAlive": true,
  "age": 25
}
```

Here, the keys may be "firstName," "lastName," "isAlive," and "age." The corresponding values include "John," "Smith," "true," and "25." To convert the data schema that follows this JSON object syntax, the FSM may first start with an initial state, which represents a starting condition of a system (e.g., a starting state/token in a structured data). For a JSON object, the initial state may be a symbol, e.g., a left curly brace "{" 410. When an input or event occurs, the FSM evaluates its current state and the conditions associated with that state to determine the next state, which are referred to state transitions, as illustrated by the edges in FIG. 4. For example, the next state to the initial state 410 may be a key string 420, a symbol, e.g., a right curly brace "}" 430, or a comma "," 440. Upon transitioning to a new state, the FSM determines the next state to the new state (now current state). For example, assuming the converted data schema transitions from the initial state 410 to a next state 420 and the state 420 becomes the current state. Based on the JSON object syntax, the next state to the current state 420 is a symbol state 422, e.g., a colon ":". The FSM may continuously process inputs and transition between states (e.g., state 424, state 430, etc.) based on the defined rules and conditions according to the structured syntax. In some embodiments, for data schema based on JSON syntax, the FSM states may end with another symbol state, e.g., a right curly brace "}".

Referring back to FIG. 3, the computing server 110 integrates 314 the language model modifier with an autoregressive machine-learned language model to modify output scores of the autoregressive machine-learned language model. In some embodiments, using the FSM as a modifier to modify output scores from a language model involves integrating the FSM into the generation process of the language model to ensure that the generated output adheres to predefined rules or constraints. In one implementation, the computing server 110 may define the desired constraints or rules for the output, e.g., valid sequences of symbols or states that the output should adhere to. The FSM may represent grammatical rules, syntactic structures, or specific patterns that the output must follow. For example, for structured data that follows JSON syntax, the first state should be a symbol, e.g., "{," the last state should be another symbol, e.g., "}," a state that next to a string state should be a symbol state, e.g., ":," and the like. The computing server 110 integrates the constrains and rules with the language model by modifying the generation process of the language model to incorporate the FSM as a modifier or filter.

In some embodiments, the computing server 110 may use the FSM to guide the generation of each token or symbol in the output sequence of the language model. At each step, the FSM determines the valid options or transitions based on the current state and the previously generated token. For example, the computing server 110 may determine a score for each output token generated by the language model based on the FSM to ensure that output satisfies the pre-defined constraints. The score may be a combination of the predicted probability of the token by the language model and the degree of the token being complying with the constrains and rules. In some embodiments, if the generated token by the language model violates a constrain/rule, the FSM may assign a score "0" (e.g., or a score that below a threshold/criterion) to the token so that the token will not be selected as output.

In some embodiments, the language model may be an autoregressive machine-learned language model. The computing server 110 may iterate on the integration of the FSM with the autoregressive machine-learned language model, refining the FSM and adjusting the generation parameters as needed to achieve the desired balance between predictability and constraint in the generated output. By using an FSM as a modifier to restricts output from a language model, the computing server 110 may convert unstructured data to structured data with custom-defined data schema, e.g., with specific rules or constraints on the generated output.

The computing server 110 receives 316 a data file which includes unstructured data. In some embodiments, the unstructured data may refer to data without any specific structure, e.g., plain text. In some embodiments, the unstructured data may refer to the data having a structure that does not follow custom-defined data schema. In some embodiments, the data file may include any data file that contains information related to payment transactions, customers, merchants, and regulatory compliance. The data file may include details such as payment amounts, currencies, and methods, along with customer and merchant information. In some embodiments, the data file may be in various formats, depending on the nature of the transactions, the systems involved, and the preferences of the parties involved. Some common formats of data files that a transaction platform may receive include: CSV (Comma-Separated Values), XML (extensible Markup Language), JSON (JavaScript Object Notation), Fixed-Width Format, Database Dump Files, EDI (Electronic Data Interchange), and the like.

The computing server 110 applies 318 the autoregressive machine-learned language model to the unstructured data to generate a structured dataset that follows the custom-defined data schema. The autoregressive machine-learned language model may analyze the unstructured data and provides a summary of the structured data subject to the constraints imposed by the language model modifier. By way of example, in some embodiments, the computing server 110 generates 320 a first output from the autoregressive machine-learned language model (LLM). In one implementation, the custom-defined schema may follow a particular syntax, such as JSON syntax. An output for the structured data from the LLM may be a key (such as, "firstName", "lastName", "isAlive", "age", etc.), a value (such as, "John", "Smith", true, 25, etc.), or a symbol (such as, "{," ":," "[", etc.), or other patterns/states that follows JSON syntax. The language model modifier may shift according to the outputs of the autoregressive machine-learned language model.

Figure 5A:
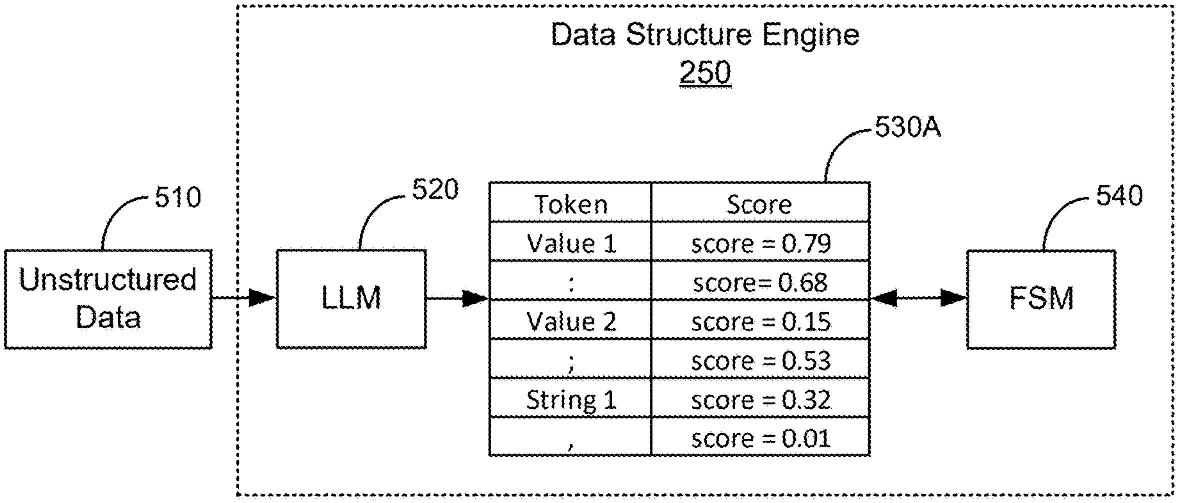
FIG. 5A illustrates a process that an autoregressive LLM outputs a set of tokens representing candidates of a second output succeeding the first output using JSON syntax, in accordance with an embodiment.

The computing server 110 receives 322 a set of tokens representing candidates of a second output succeeding the first output, and each token may be associated with a score. FIG. 5A illustrates a process that an autoregressive LLM outputs a set of tokens representing candidates of a second output succeeding the first output using a predefined syntax (e.g., JSON syntax illustrated in FIG. 4), in accordance with an embodiment. As shown in FIG. 5A, the data structure engine 250 applies the LLM 520 to the unstructured data 510, and outputs a set of tokens with scores 530A. The set of tokens are predicted by the LLM, and are candidates of a second output succeeding the first output. For example, the tokens may include key, value, symbols, etc.

In some embodiments, before applying the FSM 540 as the modifier, the score of each token may indicate a predicted probability of the corresponding token to be selected as the second output. In some implementations, the scores generated by the LLM may be a probability distribution indicating a likelihood of each corresponding token being the next output in a sequence given the preceding context/output. The probability distribution may be calculated based on the LLM's training on large amounts of training examples. For example, the LLM may determine "Value 1" has a score of 0.79, ":" has a score of 0.68, "String 1" has a score of 0.32, and the like. Without applying the FSM 540, the LLM may output the token with the highest score as the second output, e.g., "Value 1."

Referring back to FIG. 3, the computing server 110 identifies 324 a rule in the language model modifier using the first output. In some embodiments, the language model modifier may be an FSM that defines states, transitions, and constraints that represent the desired rules or patterns for the generated output. For example, for structured data with JSON syntax, the FSM states could represent keys, values, symbols, and transitions could represent valid syntactic transitions between these states.

The computing server 110 modifies 326 one or more scores of the tokens that violate the rule. In some embodiments, the computing server 110 may apply logit bias masking to modify the score of the candidate tokens. Logit bias masking involves adjusting the probabilities assigned to tokens by the language model to mitigate biases and ensure accuracy in the generated output. By selectively masking or modifying the logits (log-odds) associated with certain tokens, the LLM model may be used to generate customized output. In some implementations, the computing server 110 may modify the scores of the tokens that are output from the language model to incorporate the constraints/rules imposed by the language model modifier, e.g., FSM. In one example, the FSM may adjust the probabilities assigned to tokens by the language model based on the current state of the FSM and the transitions allowed by the FSM. When modifying the scores of the tokens, the FSM integrated LLM may consider both the original probabilities assigned by the LLM and the rules enforced by the FSM and modify the scores of the tokens (e.g., the second output) based on their compatibility with the current state of the FSM (e.g., the first output) and the transitions allowed by the FSM. For example, the computing server 110 may identify one or more candidate tokens that violate the rules of the language model modifier, and lower the score of these identified candidate tokens. In some embodiments, the computing server 110 may a score "0" (e.g., or a score that below a threshold/criterion) to the identified tokens that violate the rules.

The computing server 110 selects 328 one of the tokens as the second output based on the modified scores. At each step, the computing server 110 selects the token that maximizes the combined score, taking into account both the original language model scores and the FSM rules. In one example, the computing server 110 may modify the score of the tokens to "0" or "1" and select the tokens with scores of "1" as the output. In some embodiments, the computing server 110 may determine a threshold/criterion for selection and select tokens with scores above the threshold/criterion as the output.

In some embodiments, the computing server 110 selects the tokens for the second output and continues to the process of generating and selecting tokens of a third output succeeding the second output. In the next output, the state of FSM is also shifted based on how the FSM is constructed. For example, if the preceding output is at the state 410 in FIG. 4, the next set of output tokens will be modified by the next state of the FSM, which is state 420. In other words, if the first state 410 in the FSM specifies that the output token needs to be a symbol, other outputs by the language model, such as strings or values, will be set to zero. In the second state 420, the output token of the second output of the language model will be constrained to a string. As such, in some cases output probabilities for symbols will be set of zero. The computing server 110 uses the modified scoring mechanism to select tokens for each step/state of the output sequence. In some embodiments, the computing server 110 may evaluate the whole output sequence against the language model modifier and enforce the rules imposed by the language model modifier to ensure that the generated output adheres to the predefined rules. In some implementations, if the computing server 110 identifies that a token selection in the output sequence violates a rule, the computing server 110 will adjust the scoring mechanism or backtrack to explore alternative options that satisfy the rules.

Figure 5B:
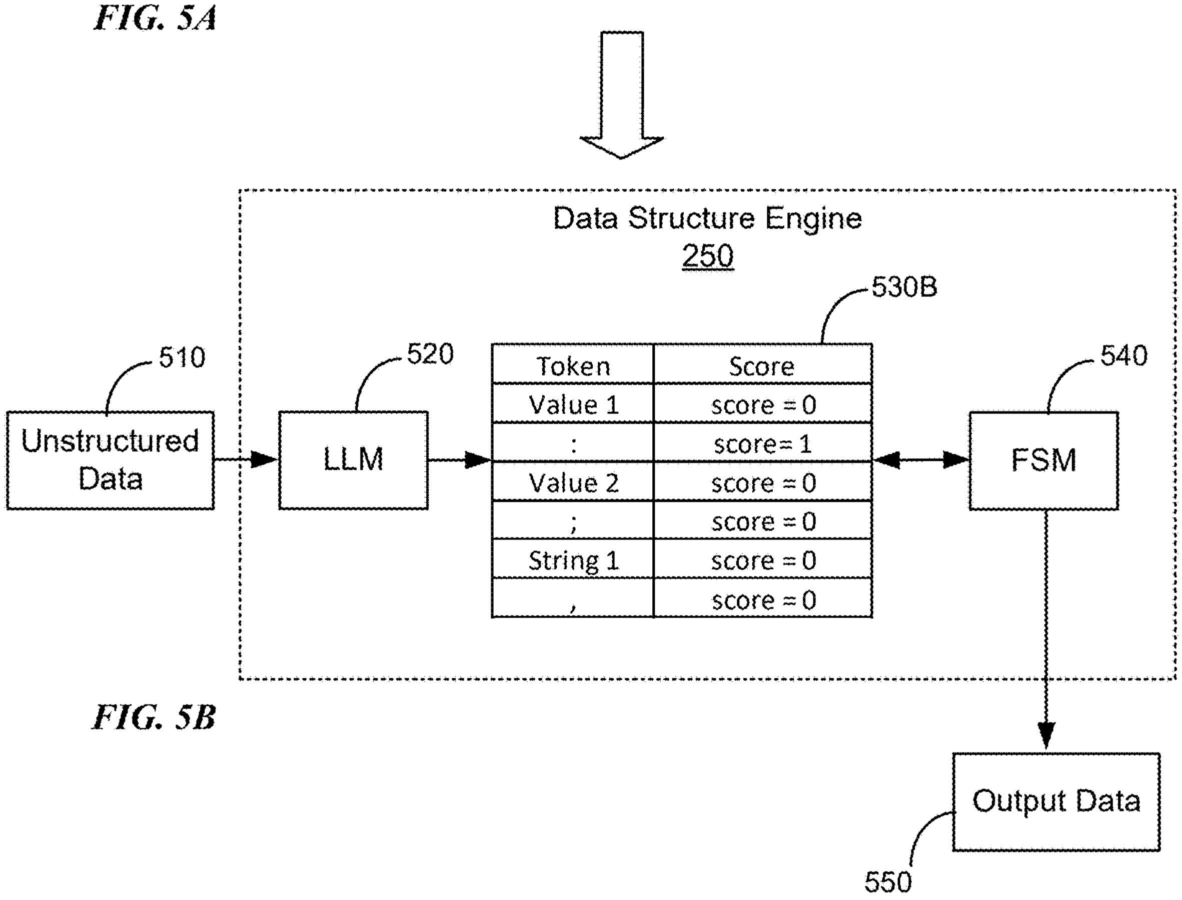
FIG. 5B illustrates a process that a language model modifier modifies one or more scores of tokens generated by the autoregression LLM with JSON syntax, in accordance with an embodiment.

FIG. 5B illustrates a process that a language model modifier modifies one or more scores of tokens generated by the autoregression LLM with a predefined syntax such as JSON syntax, in accordance with an embodiment. As shown in FIG. 5B, the language model modifier is an FSM, which identifies rules of the structured data to follow JSON syntax. For example, in a data schema that follows JSON syntax, if a current state is a "string," e.g., "firstName," the JSON syntax requires the next state (succeeding state) should be ":". The FSM identifies this rule and modifies the score of the candidate tokens. For example, in FIG. 5B, the FSM 540 modifies the scores of the set of tokens from 530A in FIG. 5A to 530B in FIG. 5B. Since the rule requires the next state (succeeding state) to be only ":" the FSM 540 modifies the score of token ":" to be "1." All the other tokens in the set would violate the JSON syntax rules, and thus the data structure engine 250 modifies the scores of other tokens to be "0." The data structure engine 250 may select a token as the second output 550 succeeding the first output based on the modified scores. As shown in FIG. 5B, the data structure engine 250 selects the token ":" which has the highest score "1" as the second output that succeeds the first output "string."

Examining Transaction Information in Data File

Figure 6:
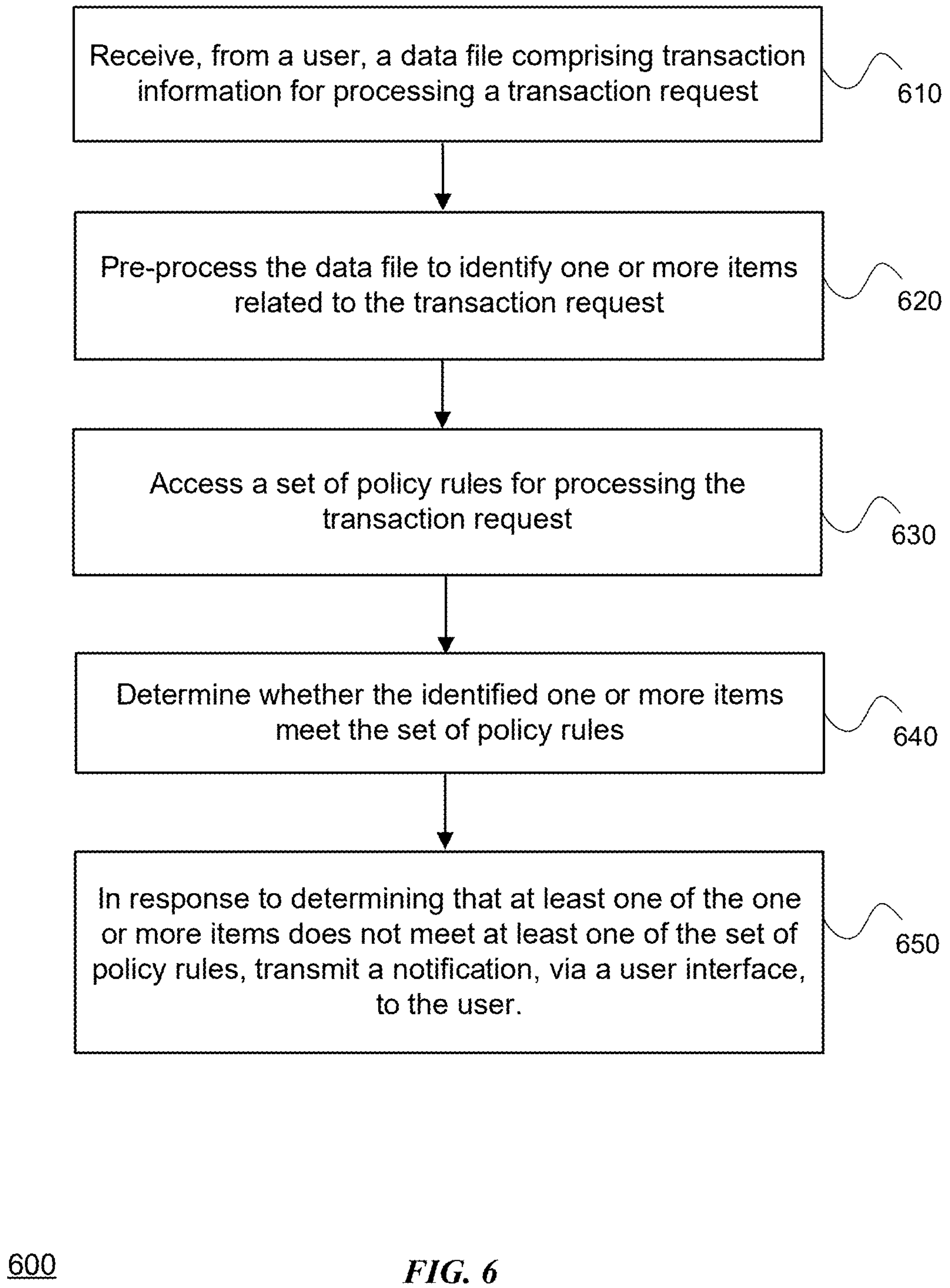
FIG. 6 illustrates an example process for examining transaction information in a data file, in accordance with an embodiment.

FIG. 6 illustrates an example process 600 for examining transaction information in a data file, in accordance with an embodiment. A computer associated with the computing server 110 includes a processor and memory. The memory stores a set of code instructions that, when executed by the processor, causes the processor to perform some of the steps described in the process 600. In some embodiments, the computing server 110 may include a policy rule engine 240 that establishes policy rules for examining the transaction information in a data file and performs the examination (e.g., audit) on the data file.

As shown in FIG. 6, the computing server 110 receives 610 a data file from a user, and the data file may include transaction information for processing a transaction request. In some embodiments, the user may transmit the data file through a user interface (e.g., interface 144), an end user transaction device 130 or a platform that is managed by the computing server 110. In some embodiments, the data file may be a paper or email receipt for a customer. In some embodiments, the data file may include a documentation record that transaction information, such as merchant, a location at which the transaction occurred, a time at which the transaction occurred, an amount which was exchanged during the transaction, and other transaction related information. In some examples, the transaction request may include reimburse the expenses of the items included in the data file to a customer/user.

The computing server 110 may pre-process 620 the data file to identify one or more items related to the transaction request. In some embodiments, the received data file may include unstructured data, and the computing server 110 may convert the unstructured data to structured data with the custom-defined data schema that is constructed according to a structured data syntax. In some embodiments, the computing server 110 may process the information included in the data file to identify required items for processing the transaction request, such as time, location, amount, etc. In some embodiments, the computing server 110 may further itemize the content of the data file to identify specific transaction items, such as alcohol related items, lodging, tips, etc. In some embodiments, the computing server 110 may request the user to itemize the content of the data file and the computing server 110 identify the user itemized content with the corresponding labels, indices, etc. In some embodiments, the computing server 110 may apply a large language model (LL M) for pre-processing the content of the received data file. In some embodiments, the data file may be a scanned image, and the computing server 110 may apply an image to text conversion to the data file to pre-processing the content of the data file. In some examples, the image to text conversion may include optical character recognition (OCR). The computing server 110 may apply the techniques described in FIG. 3 through FIG. 5 to convert any transaction information into a structured dataset, using a language model that is modified by a language model modifier.

The computing server 110 may access 630 a set of policy rules for processing the transaction request. The set of policy rules may be stored at data store 120. The policy rules may be used for reviewing and approving transactions and expense. In some embodiments, the policy rule engine 240 may determine what types of expenses are allowed, such as travel, meals, lodging, office supplies, etc. In some embodiments, the policy rules may set maximum amounts or limits for each expense category/item. For example, the policy rules may determine that for a transaction over $75, the expenses should be itemized. In some embodiments, the policy rules define the format of the data file, for example, the content of a receipt should be itemized. In some implementations, the data store 120 may include a plurality sets of policy rules, and the computing server 110 may select one of the plurality sets of policy rules for processing the transaction request. The computing server 110 may select the set of policy rules based on the user, the content of the data file, the purpose of the transaction request, etc.

The computing server 110 examines the received data file and determines 640 whether the identified one or more items meet the set of policy rules. For example, the computing server 110 may determine whether the data file includes the required format, e.g., whether the content is itemized; whether the amount input by the user matches the mount shown in the data file, and the like. In some implementations, the computing server 110 may apply a machine learning model to the pre-process data file to determine whether the identified one or more items meet the set of policy rules. In some implementations, the computing server 110 may apply the machine leaning model to the received data file to determine whether the data file meet the set of policy rules.

If the computing server 110 determines the at least one of the one or more items does not meet at least one of the set of policy rules, the computing server 110 may perform an action related to the at least one item and/or the at least one of the set of policy rules. For example, the computing server 110 may transmit 650 a notification to the user via a user interface to inform the user of the at least one item. In some embodiments, the action may include sending a notification to a user to inform the user about violation of the at least one of the set of policy rules. In one example, a receipt of a transaction over $75 does not include itemized expense, the computing server 110 may transmit a notification to a user, and/or request the user to itemize the expense. In another example, the computing server 110 may determine one of the items does not include required description, and the computing server 110 may send a notification to the user, requesting additional document. In another example, the computing server 110 may determine that an expense of one item is over the approved limit, the computing server 110 may send an alert to the user, and/or reject the reimbursement of this item. If the computing server 110 determines all items in the data file have met the policy rules, the computing server 110 may proceed to approve the transaction request, e.g., reimburse the expenses in the data file.

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Embodiments according to the invention are in particular disclosed in the attached claims directed to a method and a computer program product, wherein any feature mentioned in one claim category, e.g., method, can be claimed in another claim category, e.g., computer program product, system, storage medium, as well. The dependencies or references back in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter which can be claimed comprises not only the combinations of features as set out in the disclosed embodiments but also any other combination of features from different embodiments. Various features mentioned in the different embodiments can be combined with explicit mentioning of such combination or arrangement in an example embodiment. Furthermore, any of the embodiments and features described or depicted herein can be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In one embodiment, a software engine is implemented with a computer program product comprising a computer-readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed by the specific order claimed or described in the disclosure. Some steps may be performed before others even though the other steps are claimed or described first in this disclosure.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

What is claimed is:

1. A computer-implemented method, comprising:

receiving a custom-defined data schema, the custom-defined data schema being constructed according to a structured data syntax;

converting the custom-defined data schema into a language model modifier comprising a finite state machine that restricts outputs based on preceding outputs according to the structured data syntax;

integrating the finite state machine with an autoregressive machine-learned language model to modify output scores of the autoregressive machine-learned language model based on the finite state machine;

receiving a data file comprising unstructured data; and applying the autoregressive machine-learned language model to the unstructured data to generate a structured dataset that follows the custom-defined data schema, wherein generating the structured dataset comprises:

generating a first output from the autoregressive machine-learned language model;

receiving a set of tokens representing candidates of a second output succeeding the first output, each token associated with a score;

identifying, using the first output, a rule in the finite state machine;

modifying one or more scores of the tokens that violate the rule; and selecting one of the tokens as the second output based on the modified scores.

2. The computer-implemented method of claim 1, wherein the score includes a probability distribution indicating a likelihood of the associated token being selected as the second output.

3. The computer-implemented method of claim 1, wherein modifying one or more scores of the tokens comprises:

setting the one or more scores of the tokens to be zero.

4. The computer-implemented method of claim 1, wherein the structured data syntax includes one or more of hypertext markup language (HTML), extensible markup language (XML), JavaScript object notation (JSON), structured query language (SQL).

5. The computer-implemented method of claim 1, further comprising:

accessing a set of policy rules for processing a transaction request on the data file;

determining whether the data file meet the set of policy rules; and in response to determining that the data file does not meet at least one of the set of policy rules, perform an action related to the at least one of the set of policy rules.

6. The computer-implemented method of claim 5, wherein performing an action related to the at least one of the set of policy rules comprises:

transmitting, via a user interface, a notification to a user informing the user about violation of the at least one of the set of policy rules.

7. A computer system comprising:

a processor; and a non-transitory computer-readable storage medium having instructions that, when executed by the processor, cause the computer system to perform steps comprising:

receiving a custom-defined data schema, the custom-defined data schema being constructed according to a structured data syntax;

converting the custom-defined data schema into a language model modifier comprising a finite state machine that restricts outputs based on preceding outputs according to the structured data syntax;

integrating the finite state machine with an autoregressive machine-learned language model to modify output scores of the autoregressive machine-learned language model based on the finite state machine;

receiving a data file comprising unstructured data; and applying the autoregressive machine-learned language model to the unstructured data to generate a structured dataset that follows the custom-defined data schema, wherein generating the structured dataset comprises:

generating a first output from the autoregressive machine-learned language model;

receiving a set of tokens representing candidates of a second output succeeding the first output, each token associated with a score;

identifying, using the first output, a rule in the finite state machine;

modifying one or more scores of the tokens that violate the rule; and selecting one of the tokens as the second output based on the modified scores.

8. The computer system of claim 7, wherein the score includes a probability distribution indicating a likelihood of the associated token being selected as the second output.

9. The computer system of claim 7, wherein modifying one or more scores of the tokens comprises:

setting the one or more scores of the tokens to be zero.

10. The computer system of claim 7, wherein the structured data syntax includes one or more of hypertext markup language (HTML), extensible markup language (XML), JavaScript object notation (JSON), structured query language (SQL).

11. The computer system of claim 7, wherein the instructions that, when executed by the processor, cause the computer system to perform steps further comprising:

accessing a set of policy rules for processing a transaction request on the data file;

determining whether the data file meet the set of policy rules; and in response to determining that the data file does not meet at least one of the set of policy rules, perform an action related to the at least one of the set of policy rules.

12. The computer system of claim 11, wherein performing an action related to the at least one of the set of policy rules comprises:

transmitting, via a user interface, a notification to a user informing the user about violation of the at least one of the set of policy rules.

13. A computer program product comprising a non-transitory computer readable storage medium having instructions encoded thereon that, when executed by a processor, cause the processor to perform steps comprising:

receiving a custom-defined data schema, the custom-defined data schema being constructed according to a structured data syntax;

converting the custom-defined data schema into a language model modifier comprising a finite state machine that restricts outputs based on preceding outputs according to the structured data syntax;

integrating the finite state machine with an autoregressive machine-learned language model to modify output scores of the autoregressive machine-learned language model based on the finite state machine;

receiving a data file comprising unstructured data; and applying the autoregressive machine-learned language model to the unstructured data to generate a structured dataset that follows the custom-defined data schema, wherein generating the structured dataset comprises:

generating a first output from the autoregressive machine-learned language model;

receiving a set of tokens representing candidates of a second output succeeding the first output, each token associated with a score;

identifying, using the first output, a rule in the finite state machine;

modifying one or more scores of the tokens that violate the rule; and selecting one of the tokens as the second output based on the modified scores.

14. The computer program product of claim 13, wherein the score includes a probability distribution indicating a likelihood of the associated token being selected as the second output.

15. The computer program product of claim 13, wherein modifying one or more scores of the tokens comprises:

setting the one or more scores of the tokens to be zero.

16. The computer program product of claim 13, wherein the structured data syntax includes one or more of hypertext markup language (HTML), extensible markup language (XML), JavaScript object notation (JSON), structured query language (SQL).

17. The computer program product of claim 13, wherein the instructions encoded thereon that, when executed by a processor, cause the processor to perform steps further comprising:

accessing a set of policy rules for processing a transaction request on the data file;

determining whether the data file meet the set of policy rules; and in response to determining that the data file does not meet at least one of the set of policy rules, perform an action related to the at least one of the set of policy rules.

* * * * *